United States Patent [19]

Illers et al.

[11] 4,191,818
[45] Mar. 4, 1980

[54] PROCESS FOR PREPARING HEAT-RESISTANT POLYURETHANE ELASTOMERS HAVING NO SECONDARY SOFTENING RANGE

[75] Inventors: Karl H. Illers, Otterstadt; Herbert Stutz, Karlsruhe, both of Fed. Rep. of Germany

[73] Assignee: BASF Wyandotte Corporation, Wyandotte, Mich.

[21] Appl. No.: 923,114

[22] Filed: Jul. 10, 1978

Related U.S. Application Data

[63] Continuation of Ser. No. 730,807, Oct. 8, 1976, abandoned.

[30] Foreign Application Priority Data

Oct. 25, 1975 [DE] Fed. Rep. of Germany ....... 2547864

[51] Int. Cl.² .............................................. C08G 18/10
[52] U.S. Cl. ....................................... 528/44; 528/74; 528/76; 528/83; 528/85
[58] Field of Search ....................... 528/44, 74, 85, 83, 528/76

[56] References Cited

U.S. PATENT DOCUMENTS

| | | | |
|---|---|---|---|
| 2,723,935 | 11/1955 | Rodman | 528/83 |
| 2,871,226 | 1/1959 | McShane | 528/44 |
| 2,981,719 | 4/1961 | Mülhausen et al. | 528/83 |
| 3,192,186 | 6/1965 | Muller et al. | 521/155 |
| 3,730,927 | 5/1973 | Schloss | 260/29.2 TN |
| 3,905,925 | 9/1975 | Vervloet | 521/159 |

Primary Examiner—Maurice J. Welsh
Attorney, Agent, or Firm—John W. Linkhauer; Joseph D. Michaels

[57] ABSTRACT

Polyurethane elastomers of improved heat stability are made by a process in which a polyisocyanate is reacted with a polyol of high molecular weight with an OH:NCO ratio of 1:0.66 to 1:0.85, and the resulting adduct is later reacted with an excess of symmetrical diisocyanate and a diol as chain extender.

4 Claims, 1 Drawing Figure

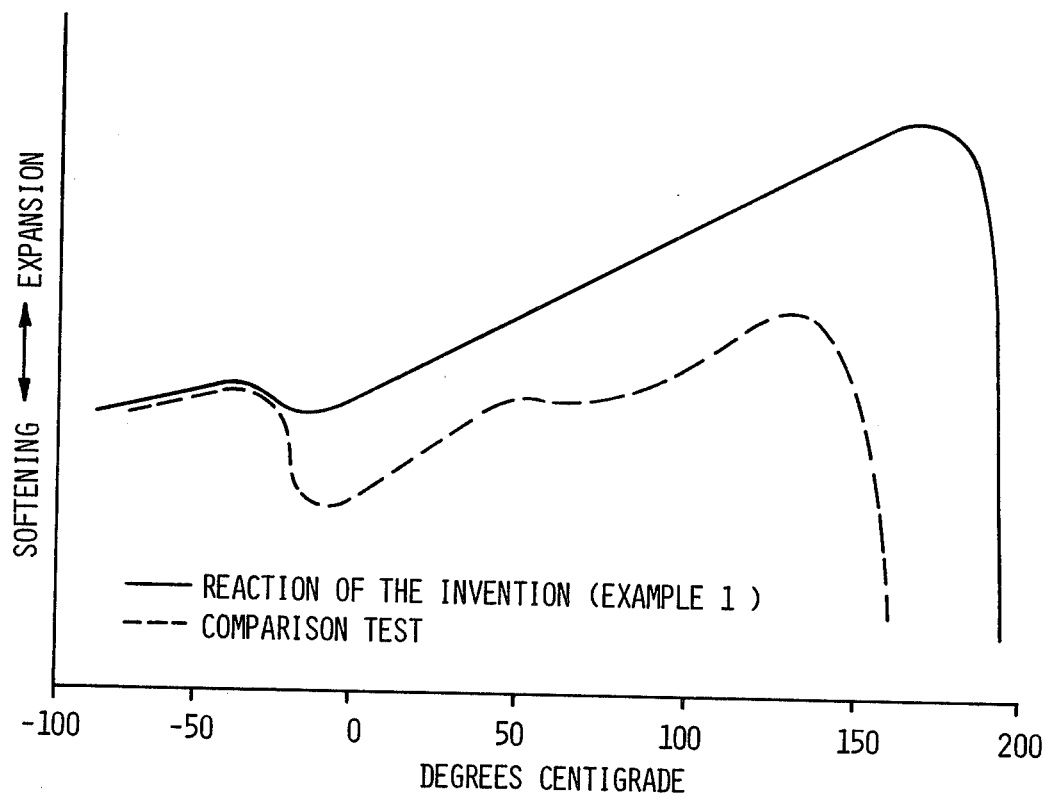

PROCESS FOR PREPARING HEAT-RESISTANT POLYURETHANE ELASTOMERS HAVING NO SECONDARY SOFTENING RANGE

This is a continuation of application Ser. No. 730,807, filed Oct. 8, 1976, and now abandoned.

BACKGROUND OF THE INVENTION

1. Field of the Invention

This invention relates to polyurethane elastomers of improved heat stability.

2. Description of the Prior Art

The invention concerns a process for the production of heat-resistant polyurethane elastomers in which an adduct containing terminal hydroxyl groups made from a primarily linear polyhydroxyl compound and polyisocyanate is reacted with a symmetrical aromatic diisocyanate in excess and chain extenders.

Polyurethane elastomers based on high-molecular-weight polyhydroxyl compounds, diisocyanates and low-molecular-weight chain extenders according to the state of the art are characterized by balanced set of properties and have therefore proved to be highly suitable in a number of applications.

Despite the advantages in their mechanical and wear properties, the polyurethane elastomers of the state of the art nevertheless have serious shortcomings which considerably restrict their applications.

This consists primarily of their inadequate heat stability, leading to early softening and thus the failure of highly stressed parts. This becomes especially undesirable when these parts are subjected to a dynamic load.

Polyurethane elastomers with improved heat stability thus far could be obtained only by the use of very costly and less common starting materials, such as naphthalene-1,5-diisocyanate, or toxic materials, such as methylene-bis(2-chloroaniline).

SUMMARY OF THE INVENTION

Polyurethane elastomers of improved heat stability are made by a process in which a polyisocyanate is reacted with a polyol of high molecular weight with an OH:NCO ratio of 1:0.66 to 1:0.85, and the resulting adduct is later reacted with an excess of symmetrical diisocyanate and a diol as chain extender.

DESCRIPTION OF DRAWING

A complete understanding of the invention may be obtained from the following and foregoing description thereof taken in conjunction with the appended drawing, the sole FIGURE of which is a graft displaying the heat-stability properties of a polyurethane polymer made in accordance with the invention, in comparison with the properties of a similar polyurethane polymer so made.

DESCRIPTION OF THE PREFERRED EMBODIMENTS

The object of the invention is to produce polyurethane elastomers of high heat stability and with good mechanical properties from inexpensive and readily available industrial starting materials.

It has been found unexpectedly that heat-resistant polyurethane elastomers from primarily linear high-molecular-weight polyhydroxyl compounds, polyisocyanates, chain extenders and, if desired, catalysts and additives, can be produced if the high-molecular-weight polyhydroxyl compounds are reacted with polyisocyanate in such a quantity that the ratio of OH:NCO groups amounts to 1:0.66 to 0.85 and the adduct obtained, containing terminal hydroxyl groups, is subsequently converted with a symmetrical aromatic diisocyanate in excess and a diol as a chain extender.

The polyurethane elastomers produced by the process of the invention have the advantage that they not only have the known high mechanical strength but also softening temperatures and ranges of more than 150°, preferably 150°–200° C. (determined by thermomechanical analysis with the TMA attachment of the DuPont Thermal Analyzer 990).

The conversion of the adducts of high-molecular-weight polyhydroxyl compounds and polyisocyanates with terminal hydroxyl groups into polyurethane elastomers can be performed by a generally known method either in one step by the one-shot process by stirring in the chain extender and subsequent addition of the aromatic diisocyanate, or in two steps by the so-called "prepolymer process", by reacting the adduct containing the terminal hydroxyl groups with additional aromatic diisocyanate into a isocyanate-group-containing prepolymer and subsequent chain extension with low-molecular-weight chain extenders. The economical one-shot method is preferably used for the production of the polyurethane elastomers of the invention.

All polyhydroxyl compounds, polyisocyanates and low-molecular-weight chain extenders known in the art are suited for the production of the polyurethane elastomers by the process of the invention. However, it is important and memorable that only those diisocyanates which form crystalline or crystallizable products with the added chain extender can be considered for the conversion of the adduct, containing the terminal hydroxyl groups, with excess diisocyanate, while the adducts containing terminal hydroxyl groups can be produced from polyhydroxyl compounds of higher molecular weight and any polyisocyanates.

High-molecular-weight polyhydroxyl compounds which can be cited are, for example, polyesters containing hydroxyl groups, polyesteramides, polyethers and/or polyacetals with molecular weights of 1,000–10,000, preferably 1,000–5,000. The polyhydroxyl compounds must be at least predominantly linear, i.e., bifunctional in the context of the isocyanate reaction. The cited polyhydroxyl compounds can be used as single components or in the form of mixtures.

Suitable hydroxyl group-containing polyesters or polyesteramides can be produced, for example, from dicarboxylic acids with 2–12 carbon atoms and polyvalent alcohols, possibly with the addition of amino alcohols or diamines. Dicarboxylic acids to be considered as examples are: aliphatic dicarboxylic acids, such as succinic acid, glutaric acid, adipic acid, suberic acid, azelaic acid, and sebacic acid, and aromatic dicarboxylic acids, such as phthalic acid, isophthalic acid, and terephthalic acid. The dicarboxylic acids can be used singly or as a mixture. For the production of the polyesterols, it may be of advantage to use the corresponding carboxylic acid derivatives instead of the carboxylic acids, such as carboxylic acid esters with 1–4 carbon atoms in the alcohol moiety, carboxylic acid anhydrides or carboxylic acid chlorides. Examples of polyvalent alcohols are glycols with 2–16 carbon atoms, preferably 2–6 carbon atoms, such as ethylene glycol, diethylene glycol, 1,4-butanediol, 1,5-pentanediol, 1,6-hexanediol, 1,10-decanediol, 2,2-dimethyl-1,3-propanediol and 2,2,4-trimethyl-1,3-pentanediol, 1,3-propanediol, 1,2-propanediol, di- and tripropylene glycol. Depending on the desired properties, the polyvalent alcohols can be used alone or in mixtures with each other or with small amounts of diamines or amino alcohols, such as ethylenediamine, 1,4-diaminobutane, piperazine, ethanolamine or N'-methyldiethanolamine. Moreover, esters of carboxylic acid with the cited diols are also suited, particularly those with 4–6 carbon atoms, such as 1,4-butanediol and/or 1,6-hexanediol, condensation products of ω-hydroxycarboxylic acids, for example, ω-hydroxycaproic acid and preferably polymerization products of cyclic lactones, for example, possibly substituted ε-caprolactones. The hydroxyl-group-containing polyesters and polyester amides have molecular weights of 1,000–5,000.

Suitable polyetherols can be produced by converting one or more alkylene oxides with 2–4 carbon atoms in the alkylene moiety with a starter molecule containing several active hydrogen atoms in bound form. Suitable alkylene oxides are, for example, ethylene oxide, 1,2-propylene oxide, epichlorohydrin, 1,2-butylene oxide and 2,3-butylene oxide. The alkylene oxides can be used singly, alternatingly in succession or as mixtures. Starter molecules to be considered are water, amino alcohols, such as N-alkyldiethanolamines, for example, N-methyldiethanolamine and diols, such as ethylene glycol, propylene glycol, 1,4-butanediol and 1,6-hexanediol. Suitable polyetherols furthermore are the hydroxyl group-containing polyethers which, like the above-cited polyesterols, have a primarily linear, i.e., bifunctional, structure, have molecular weights of 1,000–10,000, preferably 1,000–5,000. Polyacetals to be considered are primarily the water-insoluble formals, such as polybutanediolformal and hexanediolformal.

For the production of the adducts with terminal hydroxyl groups from high-molecular-weight polyhydroxyl compounds, cycloaliphatic and especially aliphatic and/or aromatic diisocyanates are preferred. Individually, one can cite as examples: cycloaliphatic diisocyanates, such as 1,4-cyclohexanediisocyanate, 4,4'-diisocyanatodicyclohexylmethane and 3-isocyanatomethyl-3,5,5-trimethylcyclohexylisocyanate (isophorone diisocyanate); aliphatic diisocyanates, such as ethylenediisocyanate, butanediisocyanate, decanediisocyanate, 2,2,4-(2,4,4)-trimethylhexamethylenediisocyanate and, preferably, 1,6-hexamethylenediisocyanate and aromatic diisocyanates, such as diphenyldiisocyanates, m- or p-phenylenediisocyanate, 2,4- and 2,6-toluenediisocyanates and their isomer mixtures, 2,2'-, 4,4'- 2,4'-diphenylmethanediisocyanates and their isomer mixtures, and preferably 4,4'-diphenylmethanediisocyanate.

As mentioned, it is important for the invention to react the adducts containing terminal hydroxyl groups with such diisocyanates which form crystalline or crystallizable urethane with the chain extender. Such diisocyanates must have a symmetrical structure. Aromatic diisocyanates, such as 1,4-phenylenediisocyanate, 1,5-naphthalenediisocyanate and 4,4'-diisocyanatediphenylmethane have proved to be useful, for example.

The cited aromatic diisocyanates, but particularly 4,4'-diisocyanatodiphenylmethane, lead to polyurethane elastomers with especially favorable mechanical properties and high heat stability, so that they are converted preferentially by the process of the invention.

Low-molecular-weight chain extenders to be considered are diols with 2–6 carbon atoms, and especially those with an even number of carbon atoms, and esters of terephthalic acid with glycols with 2–4 carbon atoms. For example, we can cite diethyleneglycol terephthalate and di-1,4-butanediol terephthalate. Preference is given to ethylene glycol, 1,4-butanediol, 1,6-hexanediol, among which 1,4-butandiol has proved to be excellent. If cellular polyurethane elastomers are to be produced by the process of the invention, water can also be used as a chain extender.

For the production of the adducts containing terminal hydroxyl groups, the high-molecular-weight polyhydroxyl compounds are reacted with any symmetrical or asymmetrical polyisocyanates of the described type in such amounts that the ratio of OH:NCO groups is 1:0.66 to 0.85, preferably 1:0.74 to 0.85. The hydroxyl group-containing adducts are then reacted with symmetrical aromatic diisocyanates and chain extenders. In order to obtain polyurethane elastomers with the mentioned excellent properties, it is important for the ratio of the number of isocyanate groups to the total number of all hydrogen atoms capable of reacting with isocyanate to amount to about 1:1 to 1.2:1, the best results being obtained with values of about 1:1 to 1.1:1.

For the production of the polyurethane elastomers of the invention, the starting components are converted at temperatures of 80°–200° C., preferably 100°–150° C. Specifically, the production takes place favorably as follows. The anhydrous high-molecular-weight polyhydroxyl compound is converted with the established quantity of any polyisocyanate under anhydrous reaction conditions to form an adduct with terminal hydroxyl groups. Further processing into the polyurethane elastomer can proceed by the two-step prepolymer method or by the more economical one-shot process. In the one-shot process, the chain extender is first stirred into the melt of the adduct containing the terminal hydroxyl groups, followed by the symmetrical aromatic diisocyanate, and after homogenization of the melt, dissolved gases are displaced by evacuation. The bubble-free castable melt is then poured into molds and hardened. During further processing by the prepolymer method, the adduct containing terminal hydroxyl groups is first converted with the aromatic diisocyanate into a prepolymer with terminal isocyanate groups, the chain extender is subsequently stirred in and, after removal of dissolved gases, the mixture is cast into molds and hardened.

Hardening of the moldings into the end product is performed by curing at temperatures of 100°–200° C., preferably 100°–150° C.

Naturally all known and customary aids and additives can be added to the reaction mixture, such as, e.g., catalysts, plasticizers, colorants, fillers, and oxidation and hydrolysis stabilizers.

The polyurethanes produced by the invention are characterized not only by the known high mechanical strength but especially by their higher softening temperatures compared to the materials known in the art. Consequently, they are excellently suited especially for those applications in which the material is subjected to thermal or dynamic stresses. They can be employed in non-cellular as well as cellular form.

The parts and percentages in the examples are parts and percent by weight units, unless otherwise indicated.

EXAMPLE 1

In a stirred flask equipped with thermometer and vacuum connection, 311.7 parts of a polyester containing hydroxyl groups and consisting of adipic acid and ethylene glycol with a hydroxyl number of 54 are dehydrated at 100° C. and 15 mm Hg for 1 hour and then reacted with 31.25 parts 4,4'-diphenylmethanediisocyanate at 100° C. for 30 min. the adduct obtained containing hydroxyl groups is reacted with 81.25 parts of 4,4'-diphenylmethanediisocyanate at 100° C. for 20 minutes to form a prepolymer containing isocyanate groups. For the production of the polyurethane elastomer, the isocyanate group-containing prepolymer is treated with a mixture of 25.1 parts 1,4-butanediol and 0.05 part methylacetone at 80° C. After the mixture is homogenized, the air dissolved in it is removed under reduced pressure and the polyurethane melt is cast into molds and cured at 120° C. for 24 hours. The thermal properties of the polyurethane elastomer produced by the process of the invention were tested by thermal analysis with a TMA attachment for the DuPont Thermal Analyzer 990. For this purpose, a specimen of 5 mm. thickness was loaded with a penetrator of 2.54 mm. diameter and a weight of 100 grams and the specimen was simultaneously heated at a rate of 5° C./min. Softening of the specimen was measured by the penetration of the penetrator.

The test revealed a linear expansion of the specimen between the glass transition temperature of the soft phase and melting of the crystalline solid phase. The specimen showed a start of softening at 185°–190° C. (see the FIGURE).

COMPARISON EXAMPLE

If the analogous procedure as in Example 1 is used, but the total quantity of 4,4'-diphenylmethanediisocyanate is added in one portion to the hydroxyl-group-containing polyester, a polyurethane elastomer is obtained for which the thermomechanical test shows a softening range between 50° and 80° C. and an ultimate start of softening at about 140° C. (see FIGURE).

Thus, using the same starting components, a polyurethane elastomer with a heat stability which was improved by 100° C. could be obtained by the process of the invention.

EXAMPLE 2

Analogous to the data in Example 1, 311.7 parts of a hydroxyl-group-containing polyester from adipic acid and ethylene glycol with a hydroxyl number of 54 were first reacted with 31.25 parts 4,4'-diisocyanatodiphenylmethane into an adduct containing terminal hydroxyl groups and then with 107.5 parts 4,4'-diisocyanatodiphenylmethane and 34.11 parts 1,4-butanediol into a polyurethane elastomer.

Thermomechanical analysis of the product revealed a softening range which started only at 190° C.

COMPARISON EXAMPLE

A prepolymer was produced from 311.7 parts of a polyester containing hydroxyl groups according to Example 2 and 138.75 parts 4,4'-diisocyanatodiphenylmethane at 100° C. and this product was subsequently cross-linked with 28.96 parts butanediol.

Thermomechanical analysis showed a softening range between 70° and 90° C. and an ultimate start of softening at about 170°–175° C.

EXAMPLE 3

If the analogous procedure as in Example 1 is used but with the production of an adduct containing terminal hydroxyl groups by the addition of 25.0 parts 4,4'-diisocyanatodiphenylmethane, followed by reaction with 98.75 parts 4,4'-diisocyanatediphenylmethane and 28.96 parts 1,4-butanediol in the second step, a polyurethane elastomer is obtained with a start of softening at 180° C. and no second softening range at lower temperatures.

The embodiments of the invention in which an exclusive property or privilege is claimed are defined as follows:

1. A process for the production of a castable heat-resistant polyurethane elastomer from primarily linear and substantially difunctional high-molecular-weight polyhydroxyl compound, polyisocyanate, and chain extender, characterized in that the high-molecular-weight polyhydroxyl compound is first reacted with such a quantity of polyisocyanate that the ratio of OH:NCO groups amounts to 1:0.66 to 1:0.85 to obtain an adduct of polyhydroxyl compound and an organic diisocyanate, which adduct is substantially anhydrous, and contains terminal hydroxyl groups, the adduct with terminal hydroxyl groups is then reacted with a diol as a chain extender and an excess of a symmetrical aromatic diisocyanate and with the provisos that the ratio of the number of isocyanate groups to the total number of all hydrogen atoms capable of reacting with the isocyanate groups amounts to approximately 1.0 to 1.2:1, and said chain extender forms a crystalline or crystallizable urethane with said aromatic diisocyanate, thereby obtaining a castable material exhibiting a start of softening at an advanced temperature of about 180° C. or greater.

2. A process according to claim 1 characterized by the fact that the symmetrical aromatic diisocyanate used as one selected from the group consisting of 4,4'-phenylenediisocyanate, 4,4'-diisocyanatodiphenylmethane, and 1,5-naphthalene diisocyanate.

3. A process according to claim 1 characterized by the fact that the chain extender used is one selected from the group consisting of ethylene glycol, 1,4-butanediol and 1,6-hexanediol.

4. A process according to claim 1 characterized by the fact that the poly- and diisocyanate consists of 4,4'-diisocyanatodiphenylmethane, and the chain extender is 1,4-butanediol.

* * * * *